United States Patent

[11] 3,592,236

| [72] | Inventor | John W. Meulendyk<br>Kalamazoo, Mich. |
|------|----------|---------------------------------------|
| [21] | Appl. No. | 829,333 |
| [22] | Filed | June 2, 1969 |
| [45] | Patented | July 13, 1971 |
| [73] | Assignee | Pneumo Dynamics Corporation<br>Cleveland, Ohio |

[54] DUAL-INPUT SERVO VALVE
12 Claims, 6 Drawing Figs.

| [52] | U.S. Cl. | 137/637.4 |
| [51] | Int. Cl. | F16k 11/22 |
| [50] | Field of Search | 137/637.4, 636.4, 637 |

[56] References Cited
UNITED STATES PATENTS

| 1,015,415 | 1/1912 | Banner | 137/637.4 X |
| 2,626,635 | 1/1953 | Eckstein | 137/637.4 X |
| 2,718,903 | 9/1955 | Noon | 137/637.4 X |

*Primary Examiner*—Clarence R. Gordon
*Attorney*—Stephen M. Mihaly

ABSTRACT: A dual-input servo valve including an inner valve sleeve having an electromechanical input device directly coupled thereto for rotation of the inner valve sleeve to control fluid flow to an actuator, and a valve plunger axially reciprocable in the inner valve sleeve by application of mechanical input to control the flow to such actuator. Should the valve plunger become stuck or jammed in the inner valve sleeve, such valve plunger and inner valve sleeve may be moved axially as a unit to control the flow to the actuator. Flow to the actuator caused by rotary movement of the inner valve sleeve can be supplemented or counteracted by appropriate axial movements of the valve plunger by itself or valve plunger and inner valve sleeve as a unit.

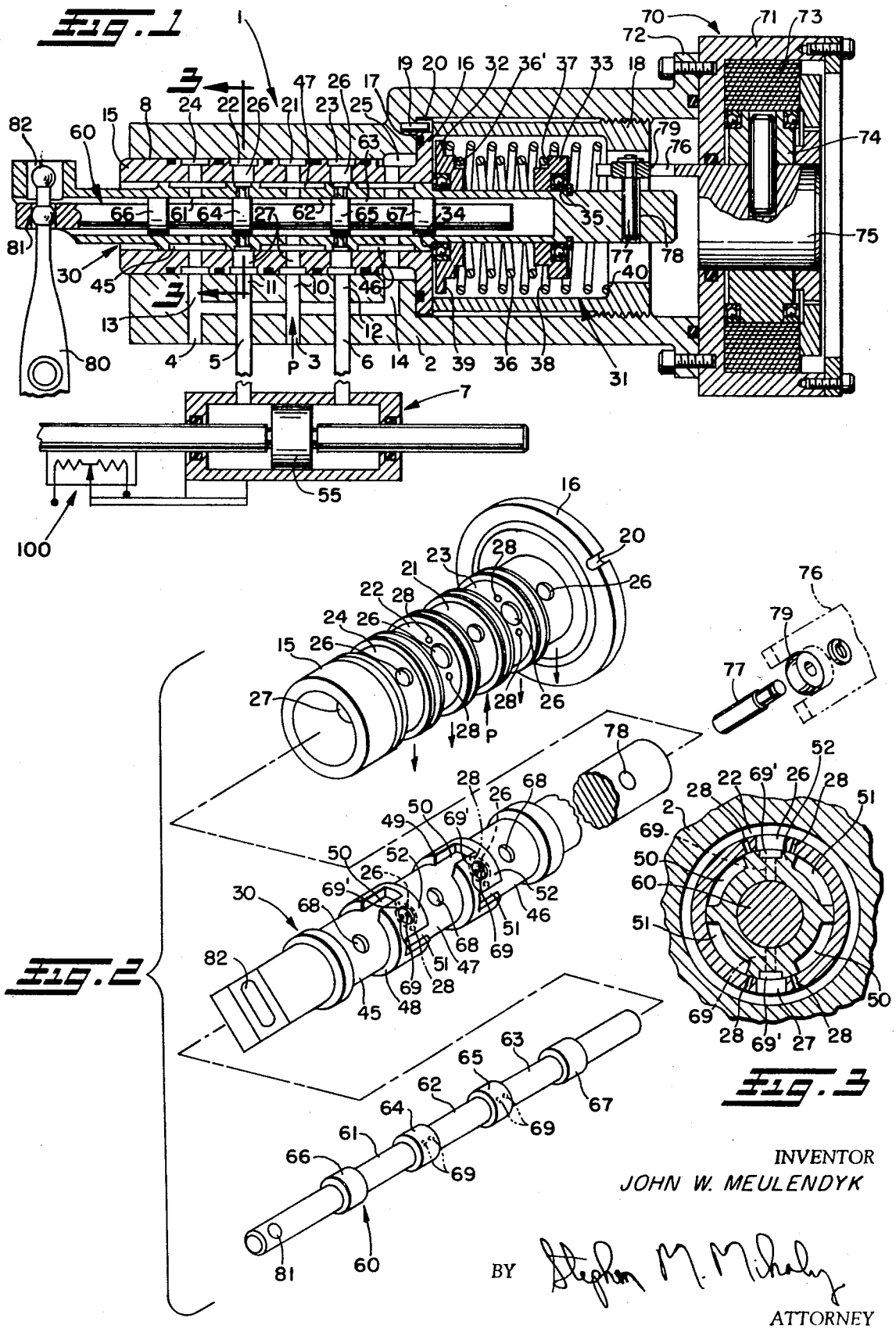

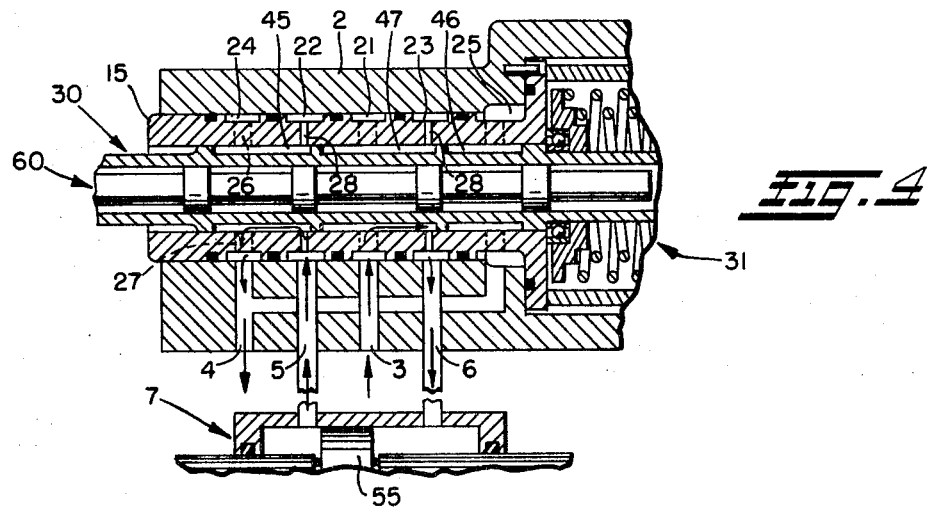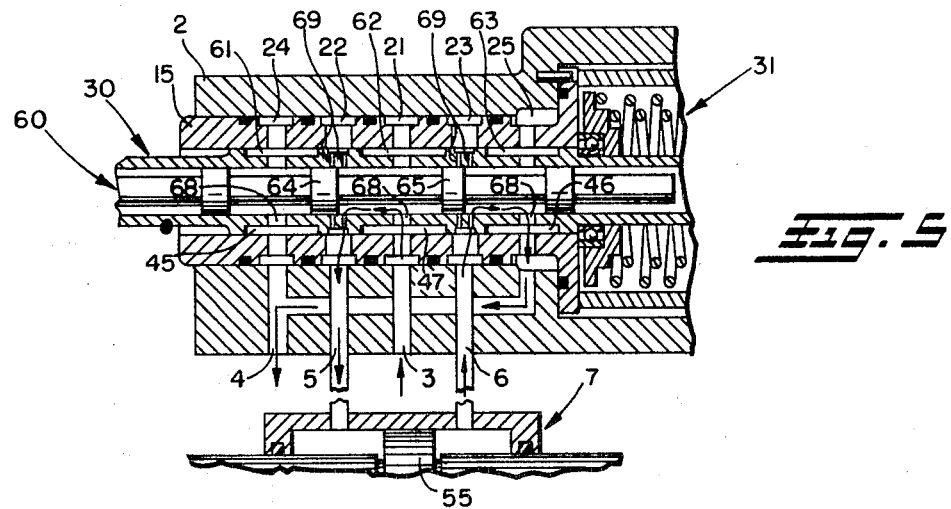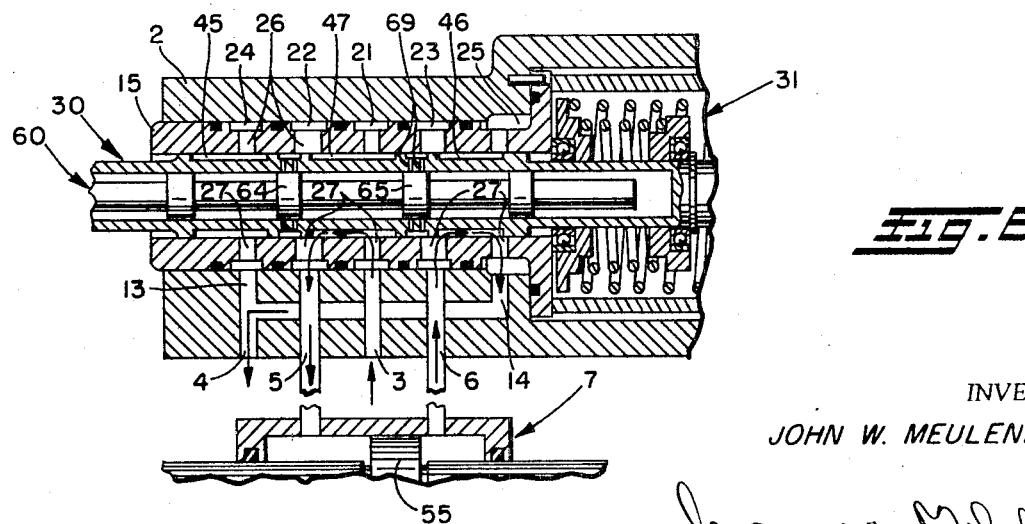

3,592,236

1

DUAL-INPUT SERVO VALVE

BACKGROUND OF THE INVENTION

This invention relates generally as indicated to a dual-input servo valve and more particularly to a servo valve which will accept both mechanical and electrical inputs for controlling fluid flow to a flight control actuator and the like.

Heretofore, it has been common practice to provide two or more primary servo valves for controlling the movements of a single-flight control actuator for aircraft, one servo valve for direct operation by the pilot, and the other servo valve for electrical operation by the autopilot. Alternatively, only one primary servo valve was provided, but its movements were controlled through suitable linkages either by a mechanical input supplied by the pilot or by a secondary servo valve operated by an electrohydraulic valve. Thus, in each instance, two servo valves were required (one primary and one secondary or two primary) along with the attendant flow passages, which greatly increased the chances for failure in the system. Moreover, in the case where an electrohydraulic valve was used to control the movements of the secondary servo valve, an isolation valve was often included in the system to disconnect the electrical input or electrohydraulic valve when not in use, thus further increasing the complexity of the system and chances for failure.

SUMMARY OF THE INVENTION

With the foregoing in mind, it is a principal object of this invention to provide a dual-input servo valve capable of accepting both mechanical and electrical inputs, thus eliminating the need for two servo valves and an isolation valve in the system.

A further object is to provide a servo valve of the type described which uses the same flow passages for directing fluid flow to an actuator in response to both mechanical and electrical inputs.

Another object is to provide such a servo valve with a rotary valve element for controlling fluid flow to the actuator, such rotary valve element being especially suited to be driven by a high-response, lightweight electromechanical device in response to the electrical inputs.

These and other objects of the present invention may be achieved by providing a dual-input servo valve with a rotatable inner valve sleeve having an electromechanical device directly coupled thereto, and a valve plunger axially reciprocable in the inner valve sleeve upon the application of a mechanical input force thereto. In the event that the valve plunger should become stuck or jammed in the inner valve sleeve, both the inner valve sleeve and valve plunger may be moved axially together upon the application of additional mechanical force to control the flow to the actuator. The same flow passages are used to control fluid flow to the actuator whether by movement of the inner valve sleeve or valve plunger.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a longitudinal section with certain parts in elevation through a preferred form of dual-input servo valve constructed in accordance with this invention showing the inner valve sleeve and valve plunger in neutral position blocking flow to an actuator cylinder connected thereto;

FIG. 2 is an exploded isometric view of the outer sleeve, inner valve sleeve, and valve plunger for the servo valve of FIG. 1 in disassembled form and rotated clockwise approximately 45° to show more clearly certain of the flow passages therein;

FIG. 3 is a fragmentary transverse section through the servo valve of FIG. 1, taken on the plane of the line 3-3 thereof;

FIG. 4 is a fragmentary longitudinal section through the metering holes in the outer sleeve and showing the inner valve sleeve rotated to an operating position for directing flow to one side of the actuator piston;

FIG. 5 is a fragmentary longitudinal section similar to FIG. 1, but with the valve plunger axially displaced for directing fluid flow to the opposite side of the actuator piston; and FIG. 6 is a fragmentary longitudinal section also like FIG. 1, but with both the valve plunger and inner valve sleeve axially displaced for directing the flow to the opposite side of the actuator piston.

DESCRIPTION OF THE PREFERRED EMBODIMENT

Referring now in detail to the drawing and first especially to FIG. 1, there is shown a preferred form of dual-input servo valve 1 in accordance with this invention, including a housing 2 having a pressure port 3 therein adapted to be connected to a suitable fluid pressure source (not shown), a return port 4 adapted to be connected to a reservoir, also not shown, and a pair of cylinder ports 5 and 6 connected to opposite ends of a fluid actuator 7 for controlling the movements of a flight control surface of an aircraft or other such device. The housing 2 has an axial bore 8 which is intersected axially along its length by a pressure feed passage 10 communicating with the pressure port 3, a pair of cylinder passages 11 and 12 straddling the pressure passage 10 and communicating with the respective cylinder ports 5 and 6, and a pair of return passages 13 and 14 straddling the cylinder passages 11 and 12 and communicating with the return port 4.

Contained within the axial bore 8 is an outer sleeve 15 having a radially outwardly projecting flange 16 at the inner end thereof which overlaps a step 17 in the axial bore 8 thus to permit the outer sleeve 15 to be clamped against such step by tightening of a nut 18 having threaded engagement with the inner end of the axial bore 8. A pin 19 extending from the step 17 into a pin slot 20 in the outer periphery of the flange 16 precludes inadvertent rotation of the outer sleeve 15. With the outer sleeve 15 thus clamped in place, annular grooves 21 through 25 in the outer periphery thereof line up with the various passages 10 through 14 in the housing 2 thus to establish communication between such passages and the interior of the outer sleeve 15 through oppositely disposed radial passages 26 and 27 communicating with each of the grooves. Metering holes 28 are also provided in the outer sleeve 15 on circumferentially opposite sides of the radial passages 26 and 27 for the annular grooves 22 and 23 as shown in FIGS. 2 and 3 for a purpose to be explained hereafter. Suitable seals may be provided to prevent leakage between the various annular grooves 21 through 25 along the wall of the axial bore 8.

Slidably received within the outer sleeve 15 is an inner valve sleeve 30 which is normally held in the axially centered position shown in FIG. 1 by a spring centering mechanism 31 consisting of a pair of axially spaced collars 32, 33 axially movable toward each other but biased apart into engagement with associated stop shoulders 34, 35 on the inner valve sleeve 30 by a first coil spring 36 positioned between the collars 32 and 33 and engaging oppositely facing shoulders 36' and 37 thereon. A second coil spring 38 coaxially disposed around the first coil spring 36 is positioned between a second shoulder 39 on the collar 32 and a shoulder 40 on the nut 18. When the inner valve sleeve 30 is thus centered, axially spaced-apart grooves 45 and 46 in the outer periphery thereof communicate with the annular grooves 24 and 25 in the outer sleeve 15 through the radial passages 26 and 27 in such outer sleeve, and an annular groove 47 intermediate the annular grooves 45 and 46 communicates with the annular groove 21 in the outer sleeve. However, there are no separate annular grooves in the outer periphery of the inner valve sleeve 30 communicating with the cylinder port grooves 22 and 23. Instead, a pair of axially spaced lands 48 and 49 on inner valve sleeve 30 separate the annular grooves 45 and 47 and 46 and 47, respectively. Each of the lands 48 and 49 has a pair of cutout portions 50 spaced 180° apart communicating with the annular grooves 45 and 47, respectively, and similar cutout portions 51 adjacent the cutout portions 50 spaced 180° apart communicating with the intermediate grooves 47 and 46, respectively. Intermediate the cutout portions 50 and 51 are land portions 52 which may be rotated to cover the radial passages 26 and metering holes 28 in the outer sleeve 15 (shown in phantom lines in FIG. 2 on the inner valve sleeve 30) to preclude flow from the cylinder ports 5 and 6 to the various grooves in the inner valve sleeve 30. However, a slight rotation of the inner valve sleeve 30 in a clockwise direction from the position shown in FIG. 2 to the FIG. 4 position will establish communication between the cylinder port 5 and return port 4 through the metering holes 28 associated with the annular groove 22, cutout portions 50 in the land 48 and annular groove 45, and also establish communication between the other cylinder port 6 and the pressure port 3 through the metering holes 28 associated with the annular groove 23, cutout portions 50 in the land 49 and annular groove 47 in the inner valve sleeve 30. Because the cutout portions 50 and 51 are of equal areas and spaced 180° apart as aforesaid, the pressure acting on opposite sides of the inner valve sleeve 30 is balanced, whereby no large side loads exist. Rotation of the inner valve sleeve 30 in the reverse direction will reverse the connections between the cylinder ports 5 and 6 and return and pressure ports 4 and 3 thus to supply fluid to the opposite end of the actuator. Accordingly, it will thus be seen that simple rotary movements of the inner valve sleeve 30 in one direction or the other will be effective in controlling the movements of the actuator piston 55.

Actuator movements may be further controlled by axial movements of a valve plunger 60 axially slidably received within the inner valve sleeve 30. Such valve plunger 60 is provided with a plurality of axially spaced grooves 61, 62, and 63 separated by lands 64 and 65, and having additional lands 66 and 67 at opposite ends of the grooves 61 and 63. The inner valve sleeve 30 has a plurality of radially extending passages 68 therein which establish fluid communication between its annular grooves 45, 46, and 47 and the annular grooves 61, 63, and 62 in the valve plunger 60. Moreover, the wide land portions 52 on the inner valve sleeve 30 have two axially spaced-apart metering holes 69 contained in annular recesses 69' which communicate with their respective cylinder ports 5 and 6 through the larger radial passages 26 and 27 associated with the cylinder ports.

When the valve plunger 60 is in the FIG. 1 neutral position, the metering holes 69 (shown in phantom lines on the valve plunger 60 in FIG. 2) are blocked by the lands 64 and 65, whereby fluid flow between the cylinder ports 5 and 6 and pressure and return ports 3 and 4 internally of the inner valve sleeve 30 is blocked. However, slight axial movement of the valve plunger 60 in one direction, as for example toward the left to the position shown in FIG. 5, will expose one of the metering holes 69 associated with one of the cylinder ports 5 to the pressure port 3 and one of the metering holes 69 associated with the other cylinder port 6 to the return port 4 thus to control flow to the actuator 7. Reverse movement of the valve plunger 60 will cause a reverse flow of fluid to and from the actuator. If fluid is already being supplied to the fluid actuator through rotation of the inner valve sleeve 30, the flow caused by movement of the valve plunger will either increase or counteract such flow, depending on which direction the valve plunger is moved.

Both the rotational movements of the inner valve sleeve 30 and axial movements of the valve plunger 60 to achieve the desired flow to and from the fluid actuator 7 may be accomplished either by mechanical or electrical inputs. However, since the forces incident to operation of the axially movable valve plunger 60 may be high due to contamination, warpage, or physical damage, it is preferred that a mechanical input device be used to control the movements of the valve plunger, whereas a high-response, lightweight electromechanical device of low inherent output force such as a torque motor 70 may be used to rotate the inner valve sleeve 30. Any external forces applied to the inner valve sleeve 30 due to valve plunger movements are taken up by the spring centering mechanism 31. The particular mounting for the torque motor 70 can be seen in FIG. 1, wherein the housing 71 is shown bolted to the open end wall 72 of the servo valve housing 2. Within the torque motor housing 71 there is a stator 73 in which is bearing mounted a rotor 74 keyed to drive shaft 75. Such drive shaft 75 is in turn suitably coupled to the adjacent end of the inner valve sleeve 30 as by providing a yoke 76 on the end of the drive shaft 75 for receipt of a pin 77 press fitted in a transverse opening 78 in the inner valve sleeve 30. Rotation of the drive shaft 75 in response to an electrical input supplied by the autopilot or other such device will be transmitted to the inner valve sleeve 30 through the yoke 76 which also accommodates linear movement of the inner valve 30 in a manner to be subsequently explained. A roller 79 may be mounted on the pin 77 for engagement with the sides of the yoke 76 to reduce friction.

For effecting axial movements of the valve plunger 60, a lever 80 (see FIG. 1) is provided, having one end extending through a transverse opening 81 in the outer end of the valve plunger 60 and received in an elongated slot 82 in the inner valve sleeve 30. The slot 82 is of sufficient dimensions to accommodate both the normal rotational movements of the inner valve sleeve 30 with respect to the valve plunger 60 and the normal axial movements of the valve plunger 60 with respect to the inner valve sleeve 30. Actuation of the lever 80 is accomplished through a suitable linkage (not shown) which is desirably pilot actuated, but alternatively may be actuated by electrohydraulic or electromechanical means if desired.

During normal manual operation of the valve plunger 60, the inner valve sleeve 30 is retained against axial movement by the spring centering mechanism 31. However, if for any reason the valve plunger 60 should become seized or jammed in the inner valve sleeve 30 due to contaminants and the like, a slight increase in the force applied through the lever 80 will cause the valve plunger 60 and inner valve sleeve 30 to move as a unit against the force of the spring centering mechanism 31 thus to control the flow to the fluid actuator 7 through the grooves 45, 46, and 47 as shown in FIG. 6 in response to mechanical inputs.

In the parallel mode of operation, the mechanical input lever 80 is held restrained, preventing flow to the actuator through linear movements of the valve plunger 60 and inner valve sleeve 30. Operation of the actuator 7 is effected by supplying an input signal from the autopilot to the torque motor 70 thus to rotate the inner valve sleeve 30 as previously described to a position causing flow to the actuator in proportion to the input signal. A feedback transducer 100 may be mounted on the actuator piston 55 to cancel the input signal to the torque motor 70 when the piston has reached the desired position, as well known in the art.

In the series mode, the torque motor 70 may still be used to rotate the inner valve sleeve 30 for causing flow to the actuator 7 as in the parallel mode of operation, but the mechanical input to the servo valve 1 is not restrained, whereby it will react in normal mechanical feedback mode, causing axial movement of the valve plunger 60 in a direction opposing the actuator piston motion resulting from the electrical input. When the hydraulic valve error due to mechanical feedback action just equals the hydraulic valve error of the original electrical input, the hydraulic valve errors will cancel each other and the hydraulic pressures on each side of the actuator piston 55 will be such that the actuator piston will support the load in the adjusted position. Thus, the resulting maximum piston position can be controlled by suitable selection of the electrical input rotation and rotary and linear valve gains.

Should there be an excessive or undesirable displacement of the actuator piston 55 caused by the electrical input to the torque motor 70, the pilot may manually actuate the lever 80 thus to cause linear movement of the valve plunger 60 with respect to the inner valve sleeve 30, if free to move, or cause linear movement of the valve plunger and inner valve sleeve together, if jammed, in a direction causing an opposing flow to the actuator thus to neutralize or compensate for the actuator movements caused by the electrical input.

From the foregoing, it can now be seen that the servo valve of the present invention is of a relatively simple and inexpensive construction which will accept both mechanical and electrical inputs to control the flow to an actuator piston through the same flow passages. No additional servo valve elements are required for the electrical input, and similarly no isolation valve or secondary actuator is required.

I, therefore, particularly point out and distinctly claim as my invention:

1. A fluid control valve comprising a housing containing a bore, said bore being intersected axially along its length by a plurality of fluid passages, a valve sleeve rotatable within said bore and having external grooves and lands for selectively blocking and establishing fluid communication between said fluid passages exteriorly of said valve sleeve at different rotational positions of said valve sleeve, means for rotating said valve sleeve within said bore, said valve sleeve further having radial passages providing communication between said fluid passages and the interior of said valve sleeve through said external grooves in said valve sleeve, a valve plunger axially slidable within said valve sleeve and having external grooves and lands for similarly selectively blocking and establishing fluid communication between said fluid passages through said radial passages in said valve sleeve at different axial positions of said valve plunger irrespective of the rotational position of said valve sleeve, and means for effecting such axial movements of said valve plunger.

2. The fluid control valve of claim 1 wherein said valve plunger is axially movable either to supplement or counteract the fluid flow due to rotational movement of said valve sleeve.

3. The fluid control valve of claim 1 wherein said plurality of fluid passages comprise a pressure feed passage, a pair of cylinder passages, and a return passage, said valve sleeve being rotatable within said bore for selectively establishing fluid communication between said pressure feed passage and one of said cylinder passages and between said return passage and the other of said cylinder passages, and said valve plunger being axially slidable within said valve sleeve for similarly selectively establishing fluid communication between said feed passage and one of said cylinder passages and between said return passage and the other of said cylinder passages.

4. The fluid control valve of claim 3 wherein said valve sleeve is also axially movable within said bore for selectively establishing fluid communication between said pressure feed passage and one of said cylinder passages and between said return passage and the other of said cylinder passages, and means are provided for resisting such axial movement of said valve sleeve except when a higher force than is normally required to move said valve plunger is applied to move said valve plunger and valve sleeve as a unit in the event that said valve plunger becomes stuck in said valve sleeve.

5. A fluid control valve comprising a housing containing a bore, said bore being intersected axially along its length by a plurality of fluid passages, a valve sleeve rotatable within said bore for selectively establishing fluid communication between said fluid passages, means for rotating said valve sleeve within said bore, a valve plunger axially slidable within said valve sleeve for similarly selectively establishing fluid communication between said fluid passages irrespective of the rotational position of said valve sleeve, means for effecting such axial movements of said valve plunger, said valve sleeve also being axially movable within said bore for selectively establishing fluid communication between said fluid passages, and means for resisting such axial movement of said valve sleeve except when a higher force than is normally required to move said valve plunger is applied to move said valve plunger and valve sleeve as a unit in the event that said valve plunger becomes stuck in said valve sleeve.

6. The fluid control valve of claim 5 wherein said means for resisting such axial movement of said valve sleeve comprises a spring centering mechanism yieldably maintaining said valve sleeve in a neutral axial position.

7. A dual-input fluid control valve comprising a housing, a bore in said housing intersected by a pressure feed passage, a return passage, and a pair of cylinder passages, an outer sleeve mounted in said bore against movement and having a plurality of passages therein communicating with said passages in said housing, an inner valve sleeve having external grooves and lands and rotatable in said outer sleeve between a first position blocking fluid communication between said cylinder passages and said pressure feed and return passages by said external lands on said inner valve sleeve and second and third positions in which fluid communication is established between one or the other of said cylinder passages and said pressure feed and return passages through said external grooves on said inner valve sleeve, said inner valve sleeve also having radial passages providing communication between said passages in said outer sleeve and the interior of said inner valve sleeve through said external grooves on said inner valve sleeve, and a valve plunger having external grooves and lands and axially movable in said inner valve sleeve between a first position blocking fluid communication between said cylinder passages in said inner valve sleeve by said external lands on said valve plunger and second and third positions in which fluid communication is established between said cylinder passages and said pressure feed and return passages through said external grooves on said valve plunger and said radial passages in said inner valve sleeve irrespective of the rotational position of said inner valve sleeve.

8. A fluid control valve comprising a housing containing a bore, said bore being intersected axially along its length by a plurality of fluid passages, a valve sleeve rotatable within said bore for selectively establishing fluid communication between said fluid passages, means for rotating said valve sleeve within said bore, a valve plunger axially slidable within said valve sleeve for similarly selectively establishing fluid communication between said fluid passages, means for effecting such axial movements of said valve plunger, said valve sleeve also being axially movable within said bore for selectively establishing fluid communication between said fluid passages, and means for resisting such axial movement of said valve sleeve except when a higher force than is normally required to move said valve plunger is applied to move said valve plunger and valve sleeve as a unit in the event that said valve plunger becomes stuck in said valve sleeve, said means for rotating said valve sleeve comprising an electromechanical device, and coupling means for coupling said electromechanical device to said sleeve to effect such rotational movement upon supplying an electrical input to said electromechanical device while accommodating such axial movements of said valve sleeve.

9. The fluid control device of claim 8 wherein said means for effecting such axial movements of said valve plunger comprises a manually operated lever operatively connected to said valve plunger.

10. The fluid control valve of claim 8 wherein said electromechanical device comprises a torque motor having a rotatable drive shaft, and said coupling means comprises a yoke mounted on said drive shaft, and a pin projecting radially outwardly from said valve sleeve and received in said yoke.

11. A dual-input fluid control valve comprising a housing, a bore in said housing intersected by a pressure feed passage, a return passage, and a pair of cylinder passages, an outer sleeve mounted in said bore against movement and having a plurality of passages therein communicating with said passages in said housing, an inner valve sleeve rotatable in said outer sleeve between a first position blocking fluid communication between said cylinder passages and said pressure feed and return passages and second and third positions in which fluid communication is established between one or the other of said cylinder passages and said pressure feed and return passages, and a valve plunger axially movable in said inner valve sleeve between a first position blocking fluid communication between said cylinder passages in said inner valve sleeve and second and third positions in which fluid communication is established between said cylinder passages and said pressure feed and return passages through radial passages in said inner valve sleeve, said inner valve sleeve having external grooves which selectively communicate said cylinder passages with said pressure feed and return passages upon rotation of said inner valve sleeve to said second and third positions through metering holes in said outer sleeve, and said inner valve sleeve has lands between said external grooves which block said metering holes in said outer sleeve when said inner valve sleeve is in said first position.

12. The fluid control valve of claim 11 wherein said inner valve sleeve is also axially movable within said outer sleeve for establishing fluid communication between said cylinder passages and said pressure feed and return passages through said external grooves in said inner valve sleeve, and a spring centering mechanism yieldably resists such axial movement of said inner valve sleeve except when a higher force than is normally required to move said valve plunger is applied to move said valve plunger and inner valve sleeve as a unit in the event that said valve plunger becomes stuck in said inner valve sleeve.